United States Patent [19]
Butler, Jr.

[11] 3,832,853
[45] Sept. 3, 1974

[54] WIND AND SOLAR ENERGY CONVERSION SYSTEM FOR MULTI-STORY BUILDINGS

[76] Inventor: Tony W. Butler, Jr., 3224 Timmons, Apt. No. 136, Houston, Tex. 77027

[22] Filed: Mar. 26, 1973

[21] Appl. No.: 345,093

[52] U.S. Cl. .............................................. 60/641
[51] Int. Cl. ............................................ F03q 7/02
[58] Field of Search................ 60/26, 8, 9, 10, 59 T, 60/59 R

[56] References Cited
UNITED STATES PATENTS

| | | | |
|---|---|---|---|
| 2,461,032 | 2/1949 | Bush ........................ | 60/26 |
| 2,544,474 | 3/1951 | Swanton, Jr. .............. | 60/26 |

FOREIGN PATENTS OR APPLICATIONS

| | | | |
|---|---|---|---|
| 353,279 | 7/1931 | Great Britain ............. | 60/26 |
| 379,364 | 9/1907 | France ...................... | 60/26 |
| 1,109,568 | 1/1956 | France ...................... | 60/26 |

*Primary Examiner*—Edgar W. Geoghegan
*Assistant Examiner*—H. Burks, Sr.
*Attorney, Agent, or Firm*—Torres & Berryhill

[57] ABSTRACT

Kinetic wind energy is converted to potential energy for use in a multi-story building by employing the wind energy to rotate wind wheel assemblies mounted on the building. The wheel assemblies are in turn employed to compress air which is stored in a chamber contained within the associated building. The compressed air is employed to drive an electric generator which provides supplemental electricity for the building. A solar energy conversion system is included with the building whereby radiant solar energy is employed to heat air in vertical columns contained between spaced walls of glass which form the sides of the building. The rising air is employed to rotate a squirrel cage type assembly on the building roof which in turn is employed to power an air compressor for supplying pressurized air to the compression chamber. When storage is not required, the kinetic energy acting on the system may also be converted to mechanical energy which is employed to directly power electrical generators and/or air conditioning compressors.

21 Claims, 12 Drawing Figures

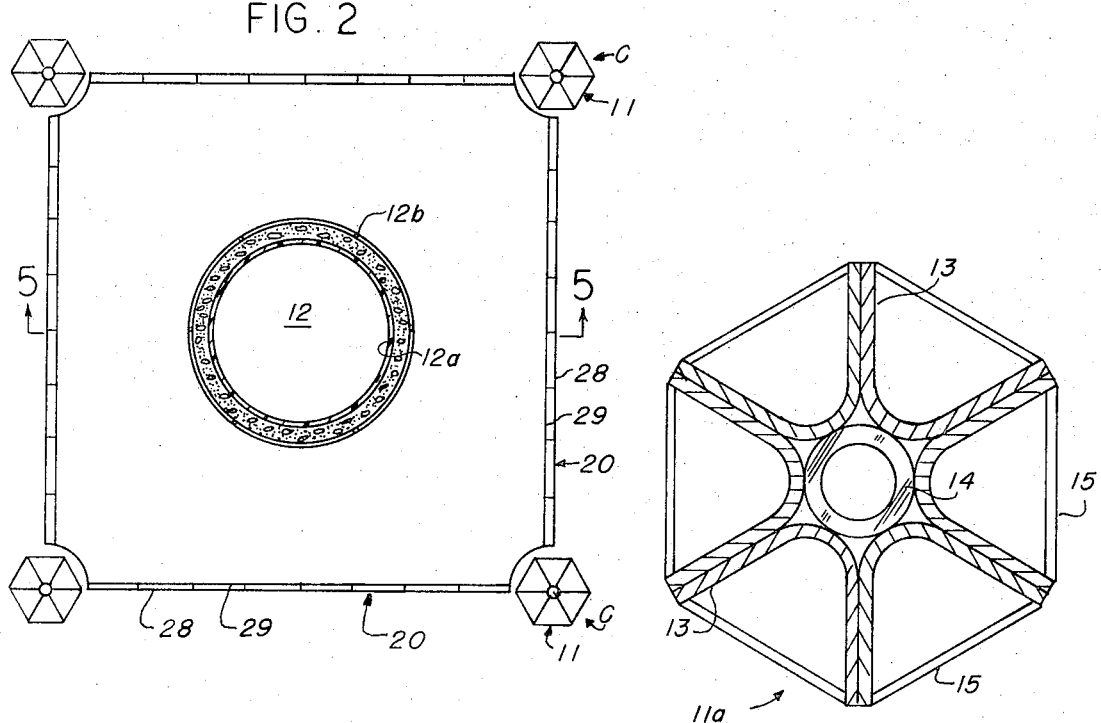
FIG. 2
FIG. 3
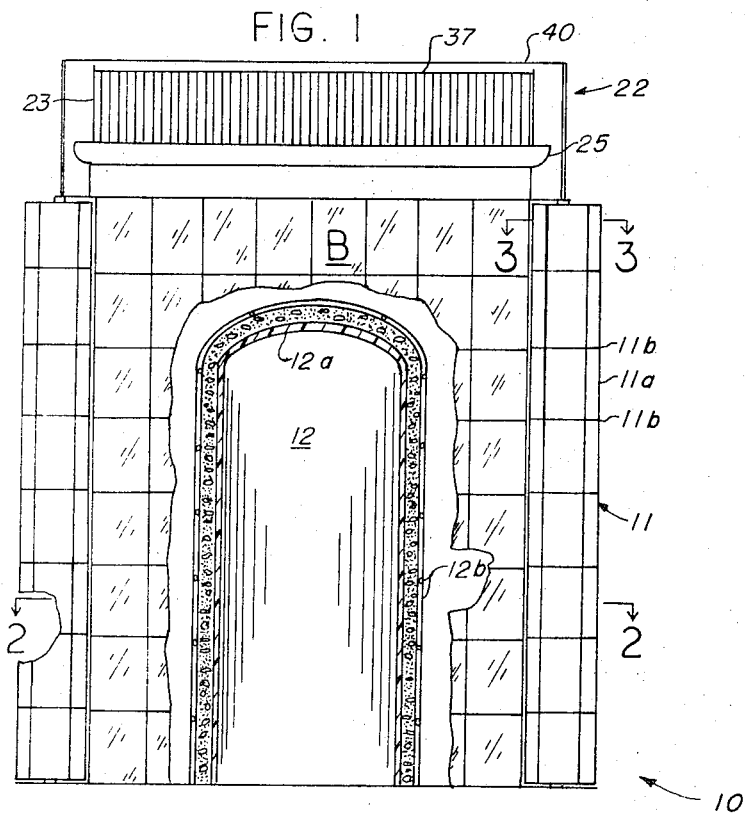
FIG. 1
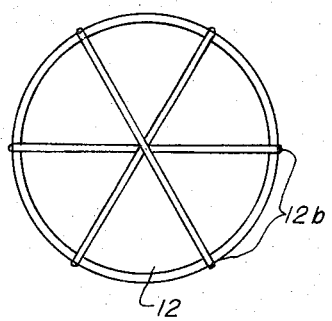
FIG. 4

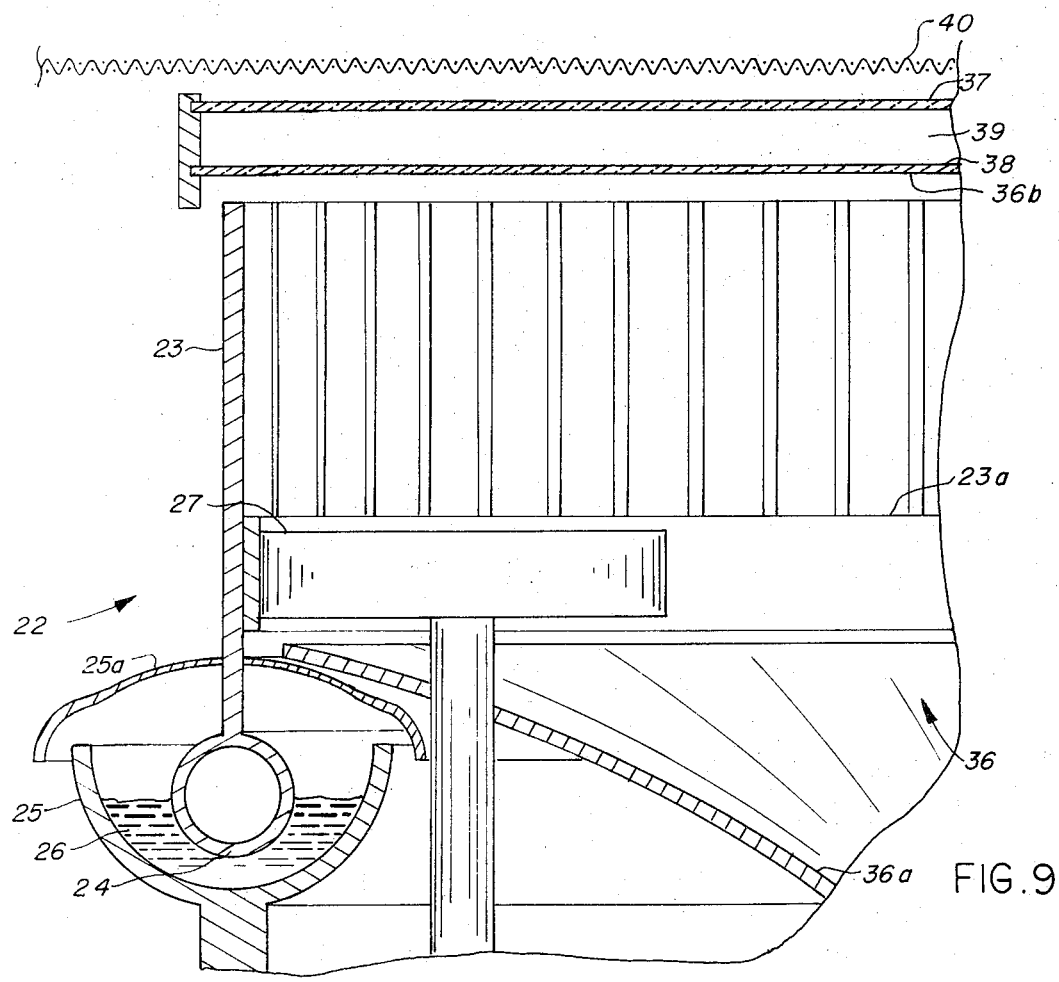
FIG. 9
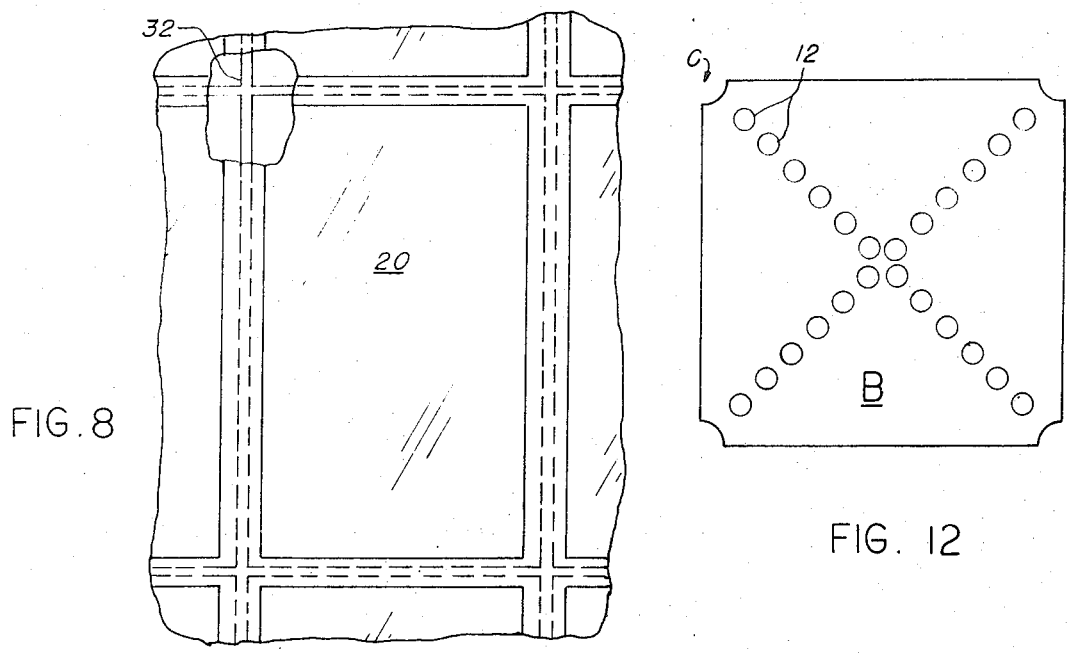
FIG. 8
FIG. 12

WIND AND SOLAR ENERGY CONVERSION SYSTEM FOR MULTI-STORY BUILDINGS

BACKGROUND OF THE INVENTION

1. Field of the Invention

The present invention relates to means for converting naturally occurring kinetic energy to energy in a form in which it may be stored and thereafter employed to produce electrical or mechanical energy. More particularly, the present invention relates to a system employed in conjunction with a multi-story building wherein wind energy and solar energy are employed to rotate mechanical elements for the purpose of generating electrical or mechanical energy or storing the kinetic energy in the form of compressed air.

2. Brief Description of the Prior Art

Various means have been employed for converting wind and solar energy to potential energy. Because of the increasing difficulty in employing and obtaining inexpensive fossil fuels, usage of such energy converting means has become of increasing importance. Since wind and solar energy are the most common forms of naturally occurring energy, they have long been employed in energy conversion systems. In contemporary usage, any mechanism or system designed to convert kinetic energy supplies either by the wind or from the sun's rays should be capable of blending in with the surrounding environment in a nonobtrusive and practical manner.

While it is not likely that such conversion systems can completely supply all of the energy requirements of modern living and working requirements, the cost of obtaining energy and its scarcity are making systems which supply supplemental energy more and more practical.

SUMMARY OF THE INVENTION

It is a recognized phenomenon that tall structures which project above their surroundings are exposed to an abnormally high amount of air movement. This fact coupled with the increased exposure that tall structures have to the radiant energy of the sun and the atmospheric pressure differential (from bottom to top) over which the effect of this radiant energy is manifested cooperates in making the system of the present invention particularly advantageous when employed with multi-story office or residence buildings. It will be appreciated, however, that while intended primarily for use with tall structures, the present invention may be employed in a building of substantially any size.

In the system of the invention, the wind normally present around a tall building is employed to rotate mechanical elements associated with the building and the resulting rotary mechanical motion is employed to compress air which is then stored in one or more compression chambers contained within the building. An external, double glass wall arrangement is also employed whereby air contained between the walls is heated by the sun's radiant energy causing it to rise upwardly to power a roof mounted fan assembly which in turn is also employed to produce compressed air.

With the system of the present invention, energy conversion is accomplished by structures which are compatible with the building and the surrounding environment and the facilities employed to produce the energy conversion cooperate in supplying the normal sheltering requirements of the building.

From the foregoing it may be appreciated that one of the primary objects of the present invention is to provide an energy conversion system in which wind and solar radiant energy may be converted to potential energy;

Another object of the present invention is to provide an energy conversion system of the type described which is an integral part of a multi-story building whereby the converted energy may be employed to supply all or a portion of the energy requirements of the building.

Another object of the present invention is to provide an energy conversion system which is compatible with customary building construction, which elminates the need for lengthy transmission lines or other means of conveying energy to connect the energy conversion means with the place of ultimate energy usage, and to provide such a system with components which provide some of the sheltering functions of a conventional building.

The foregoing and other objects, features and advantages of the invention will be more fully appreciated from the following specification and the related drawings and claims.

BRIEF DESCRIPTION OF THE DRAWINGS

FIG. 1 is an elevation, partially broken away, illustrating a multi-story building employing the wind and solar energy conversion system of the present invention;

FIG. 2 is a horizontal cross-sectional view taken along the line 2—2 of FIG. 1;

FIG. 3 is an enlarged scale horizontal cross-sectional view taken along the line 3—3 of FIG. 1 illustrating details in the construction of a wind wheel employed in the energy conversion system of the present invention;

FIG. 4 is a plan view taken along the line 4—4 of FIG. 5 illustrating details of the compression chamber employed in the present invention;

FIG. 8 is a partial side elevation, partially broken away, illustrating the window wall sections employed in the invention;

FIG. 9 is an enlarged partial section of the roof mounted fan assembly employed as a part of the energy conversion means of the present invention;

FIG. 12 is a schematic diagram illustrating a horizontal section of a modified building wherein a plurality of compression chambers are employed as vertical support columns for the building.

DESCRIPTION OF THE ILLUSTRATED EMBODIMENT

Figure 5:
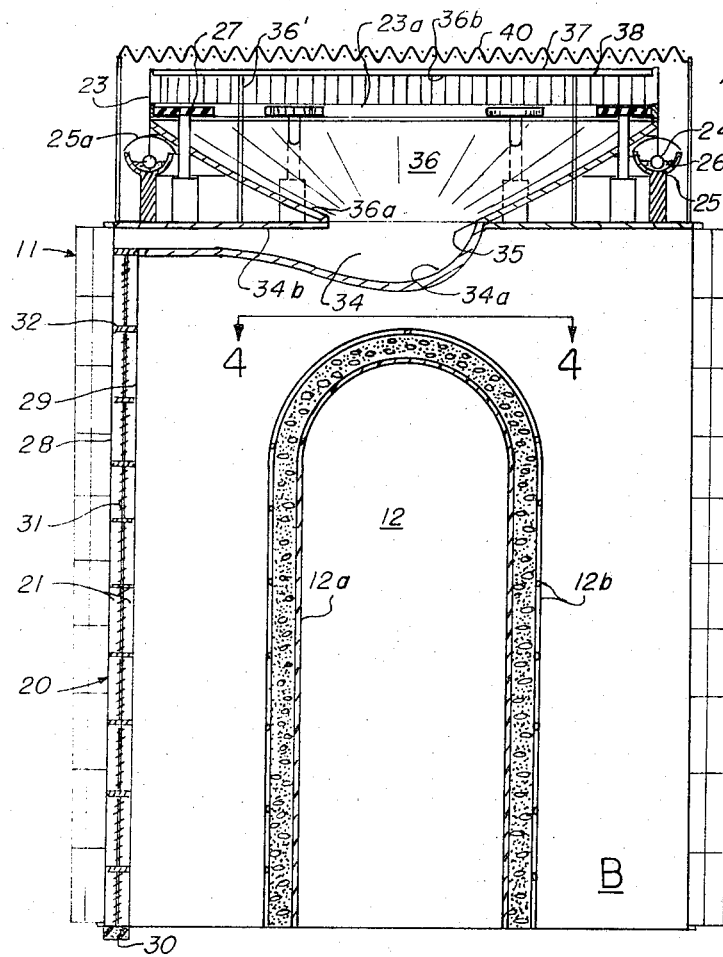
FIG. 5 is a vertical section taken along the line 5—5 of FIG. 2.

With reference to the drawings, a multi-story building B employing the energy conversion system of the present invention is indicated generally at 10 in FIGS. 1 and 5. The system of the present invention applies compatible energy conversion systems to a multi-story building for converting kinetic wind energy and radiant solar energy into potential energy and then converting the potential energy to electric and mechanical power to be employed to assist in lighting, heating and cooling the associated building.

FIGS. 1-4 illustrate the wind conversion portion of the present invention which includes a plurality of vertically extending wind wheel members 11 whose axes are preferably located at or near the corners C of the building B to provide the most effective exposure to the wind. As will be more fully described hereinafter, the wind conversion means includes a suitable drive system (FIG. 11) connected between each wind wheel and one or more conventional air compressor units for converting the rotary motion of the wind wheels 11 to potential energy in the form of compressed air which is stored in a large compression chamber 12 located at the center of the building B. The chamber 12 is preferably constructed of reinforced concrete with a lining 12a of fiberglass or other suitable material to seal the inner surface of the chamber 12 so that it will withstand the high pressure of air within the chamber 12. Structural strength is also supplied by reinforcing cables 12b which surround the chamber 12 as illustrated in FIGS. 2, 4 and 5. It will be appreciated that, if desired, a plurality of smaller chambers rather than a single large chamber may be geometrically arranged throughout the building B to act as storage means for the compressed air. For example, hollow vertical support columns constructed in a manner similar to the chamber 12 may be spaced along the horizontal diagonal lines of the building to be employed as multiple storage chambers for the compressed air as shown in FIG. 12.

Figure 11:
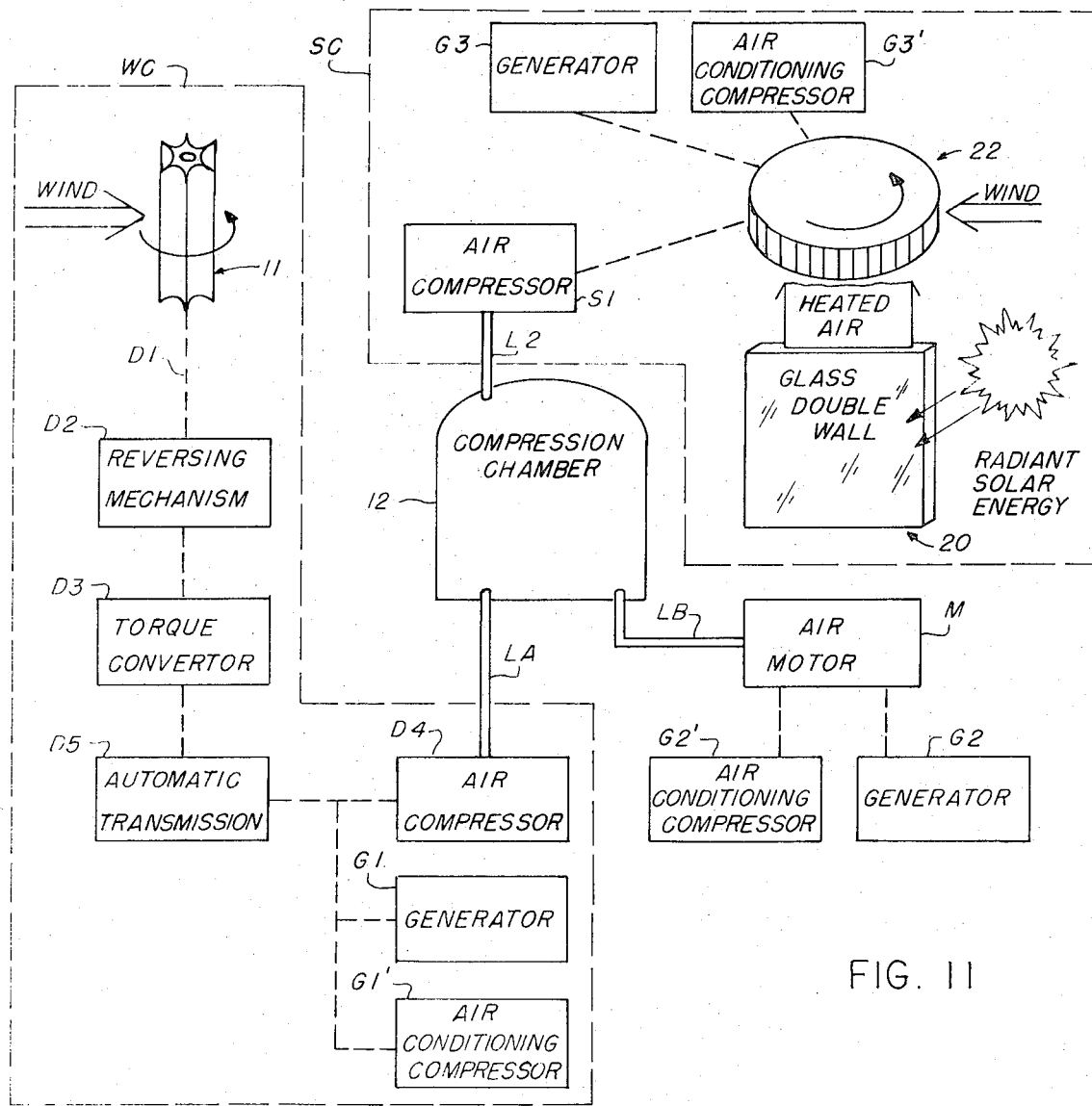
FIG. 11 is a block diagram schematically illustrating the overall operation of the energy conversion system of the present invention.

In an exemplary embodiment of the present invention schematically depicted in FIG. 11, the wind conversion portion WC of the system 10 includes a drive linkage D1 conveying the rotary motion of the wheels 11 to a reversing mechanism D2. The latter device automatically rotates a torque converter D3 in a single selected direction irrespective of the direction of rotation of the wheels 11. Converter D3 powers an air compressor D4 through an automatic transmission D5. The compressor is thus powered by the wind driven wheel 11 to compress air which is then supplied over a conduit LA to the chamber 12. As the chamber pressure increases, the transmission D5 automatically changes the gearing ratio between the torque converter output and the transmission output so that more torque is available for powering the compressor D4.

When storage of energy is not desired, the transmission D5 may be employed to drive an electric generator G1 and/or an air conditioning compressor G1'. The alternating current output of the generator may be connected into the electrical system of the building B to provide supplemental power. The potential energy provided by the compressed air in the chamber 12 is converted to electrical energy by conveying air in the chamber over a conduit LB as required to energize an air motor M which mechanically powers a generator G2 and/or air conditioning compressor G2'. Power from the generator portion of G2 is also connected into the electrical system of the building. The components D2, D3, D4, D5, G1, G1', M, G2 and G2' are conventional.

The detailed construction of the wind wheels 11 is best illustrated in FIG. 3. The wheels are preferably formed of similar stacked sections 11a. Each section 11a comprises a plurality of longitudinally extending, laterally curved blades 13 formed from a light weight material and attached to a bearing and support assembly 14. The assembly 14 is in the form of a relatively short tubular body which is connected between adjacent sections 11a to hold the section together. Braces 15 are provided at the outer edge of each section 11a to secure the blades and to maintain correct blade positioning. In an exemplary embodiment of the present invention, each section 11a is approximately 30 feet in diameter and 10 feet in height.

Figure 10:
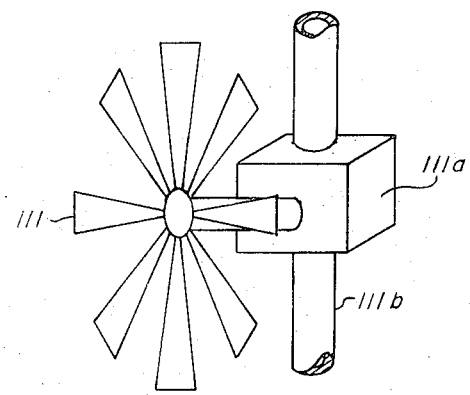
FIG. 10 illustrates a modified form of the invention employing propellers rather than wind wheels for conversion of wind energy.

A modified form 111 of the wind conversion mechanism is illustrated in FIG. 10. The mechanism 111 is a multibladed propeller which is adapted to be rotated by the wind. The rotary motion of the blades is transferred through a gear box 111a to a vertical drive shaft 111b. The latter shaft may be employed to rotate the drive shaft D1 illustrated in FIG. 11. In the modified system, a plurality of mechanisms 111, adapted to swing into the wind, are spaced vertically along the shafts 111b at each corner of the associated building.

Details of the construction of the solar energy conversion portion of the present invention are illustrated in FIGS. 4-9. The multi-story building B of FIG. 5 is equipped with continuous, double wall glass side walls 20 which trap radiant solar energy and convert it to potential energy. Conversion is effected when the energy heats air in a plurality of air columns 21 formed by the spacing between the double walls of the sides 20. Heating causes the air in the columns to rise forcing the air through a circular, squirrel cage type fan assembly indicated generally at 22 on the roof of the building B.

The fan assembly 22 (best illustrated in FIG. 9) comprises a circular blade wall 23 secured along its lower edge to a toroidal float ring 24 which rotatably supports the blade wall 23 in a trough 25, filled with a suitable liquid 26. The trough 25 is covered by a U-shaped member 25a attached to the blade wall 23 to prevent foreign matter from contaminating the liquid 26. The panels 25a are preferably removable so that necessary maintenance can be performed as required.

The rising air in the walls 20 is channeled into the center of the fan assembly 22 where it picks up additional solar energy, before causing the blade wall 23 to rotate in the trough 25. A plurality of spring loaded drive wheels 27 engage an inner track 23a on the blade wall 23 to transfer the rotary motion of the blade assembly to drive air compressor unit S1 (FIG. 11) used in pressurizing the chamber 12 and alternatively used to drive one or more generators G3 for generating electricity and air conditioning compressors G3'. The units G2, G2', G3 and G3' are conventional mechanisms which can be driven alone or simultaneously. The drive mechanism conveying the rotary mechanical movement to the various compressors and generators will also be understood to include only conventional mechanisms such as suitable clutching and automatic transmission means as well as other suitable power transmission means.

Figure 7:
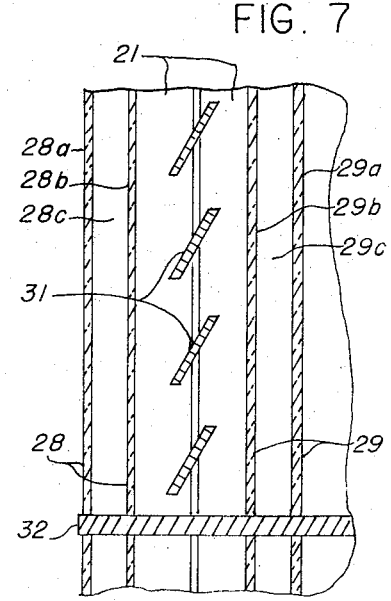
FIG. 7 is an enlarged partial vertical section taken along the line 7—7 of FIG. 6 illustrating details in the construction of window sections employed in the solar energy conversion portion of the present invention.

Referring to FIG. 5, air enters the air column 21, formed between window walls 28 and 29, through a suitable filter system 30 located at the bottom of the column 21. Within the column 21 are a plurality of vertically spaced, horizontally disposed slats 31 which are treated with a suitable material which will absorb the radiant energy from the sun and transfer the energy to the surrounding air in the form of heat. The slats are inclined to admit reflective light and to permit visibility through the walls while simultaneously absorbing the maximum amount of solar radiant energy. To reduce heat losses, all window supports 32 are covered with suitable insulating material, and as best illustrated in FIG. 7, each window wall 28 and 29 is conventionally constructed using two spaced layers of glass 28a, 28b and 29a, and 29b, respectively which form vacuum areas 28c and 29c respectively. Each area 28c and 29c acts as insulation and prevents transfer of heat by condition which in turn insulates the interior of the building. Conventional glass such as Thermopane or other suitable means may be employed for the walls 28 and 29. The outer window sections 28 are preferably made of untinted glass to allow the radiant energy to strike the slats 31 while the inner sections 29 may be tinted to further reduce radiant energy transfer into the building to help keep the building cool. While large sections of plate glass are illustrated in the drawings, it will be appreciated that each window section may be formed of an insulated frame assembly supporting a plurality of smaller, insulated glass panes. The window wall 29 and the slats 31 are preferably mounted to hinge open inwardly allowing the slat assemblies 31 and the inside surfaces of the window sections 28 and 29 to be cleaned.

As the air is heated in the columns 21, it rises at a velocity which increases as the air takes on more heat energy toward the upper end of the building. The heated air then enters a first contoured area 34 having a lower surface 34a, and an upper surface 34b. Each surface 34a and 34b is covered with a suitable material to prevent heat losses. The hot air flows from the area 34 through an opening 35 into a second enlarged area 36 enclosed by a lower flared surface 36a and an upper surface 36b supported from below by narrow support columns 36' suitably insulated so as not to absorb heat energy. The flared surface 36a, which includes a black surface for absorbing the sun's radiant energy, directs the heated air through openings in the blade wall 23 causing the blade wall to rotate. As shown best in FIG. 9, the surface 36b is also formed conventionally of a dual-pane glass wall 37 and 38 which form a vacuum area 39 to prevent heat loss. These dual-pane sections 37 and 38 are protected from hail damage by a suitable wire mesh 40.

FIG. 11 schematically depicts the solar energy conversion portion SC of the present invention in which the radiant solar energy incident on the glass walls 20 is employed to heat air which rises through the spaces formed between the glass walls. The rising air rotates the blade wall 23 which powers the units S1, G3 and G'. Compressed air from the compressor S1 is supplied by a conduit L2 to the chamber 12 where it may be stored until required for subsequent usage to power the motor M.

Figure 6:
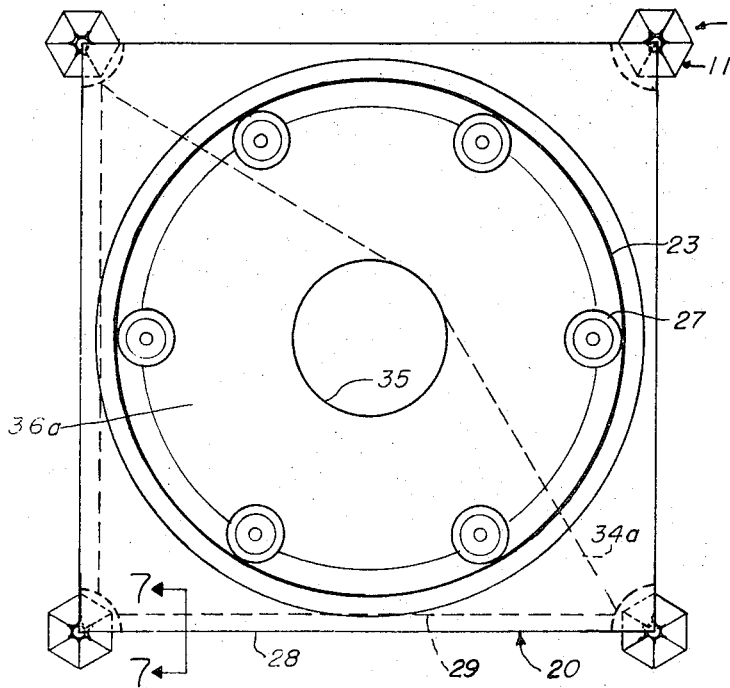
FIG. 6 is a plan view of the multi-story building of FIG. 1.

While all four sides of the building B may be equipped with walls such as the walls 20, if desired, only the two walls having the maximum exposure to the sun may be so equipped. Depending upon the geographical location of the building, maximum exposure to the sun will occur on either the building's opposite or adjacent sides. In FIGS. 5 and 6, only the two sides of the building B facing southeast and southwest are eqiupped with the windows 20. The dotted line configuration indicated at 34a in FIG. 6 depicts the shape of the flow conducting structure employed to convey the heated air in the walls to the fan assembly 22. For purposes of clarity, the screen 40 has not been illustrated in FIG. 6.

It will of course be appreciated that the system of the present invention may also be employed with variously shaped buildings which may take on triangular cross-sections or any other suitable shape. Other modifications of the present invention are also possible and for this reason it will be understood that the foregoing disclosure and description of the invention is illustrative and explanatory thereof, and various changes in the size, shape and materials as well as in the details of the illustrated construction may be made within the scope of the appended claims without departing from the spirit of the invention.

I claim:

1. An energy conversion system associated with an edifice for converting naturally occurring kinetic energy to potential energy comprising:
    a. first converting means including wind-driven means, for converting naturally occurring kinetic energy to mechanical power;
    b. compressing means driven by said mechanical power for compressing a gaseous medium;
    c. storage means connected with said compressing means for containing said gaseous medium at a pressure value above the ambient atmospheric pressure value; and
    d. second converting means connected with said storage means for converting the potential energy of said pressurized, stored gaseous medium to kinetic energy.

2. A system as defined in claim 1 wherein said first converting means further includes:
    a. solar conversion means for converting radiant solar energy to heat for heating a gaseous substance; and
    b. gas driven means powered by the movement of said heated gaseous substance.

3. A system as defined in claim 1 wherein:
    a. said edifice includes a multi-sided building wherein said sides intersect to form corners; and
    b. said wind driven means includes means positioned along at least one or more of said corners whereby wind moving past said edifice causes said wind driven means to rotate.

4. A system as defined in claim 3 wherein said wind driven means includes multibladed wind wheels extending vertically along at least one of said corners.

5. A system as defined in claim 3 wherein said wind driven means includes radially extending, vertically positioned propeller blade means.

6. A system as defined in claim 2 wherein:
    a. said edifice includes a multi-sided building wherein said sides intersect to form corners; and
    b. sand wind driven means includes means positioned along at least one or more of said corners whereby wind moving past said edifice causes said wind driven means to rotate.

7. A system as defined in claim 6 wherein said solar conversion means includes:
   a. transparent, spaced walls formed along at least a portion of the external side surfaces of said edifice;
   b. air conducting passage means extending vertically between said spaced walls; and
   c. heat absorbing means contained within said passage means for absorbing solar energy and converting it to heat for heating air in said passage means.

8. A system as defined in claim 7 wherein said gas driven means includes a rotatable fan assembly mounted on the top of said edifice operable to convey rotary mechanical motion to said second converting means.

9. A system as defined in claim 8 wherein said storage means includes a vertically extending pressure chamber centrally disposed within said edifice.

10. A system as defined in claim 6 further including means for selectively conveying said mechanical power to said compressing means, an electrical generating means or an air conditioning compressor means.

11. A system as defined in claim 7 wherein said fan assembly is rotatably floated in a circular, fluid containing mounting means.

12. A system as defined in claim 10 wherein said solar conversion means includes:
   a. transparent, spaced walls formed along at least a portion of the external side surfaces of said edifice;
   b. air conducting passage means extending vertically between said spaced walls; and
   c. heat absorbing means contained within said passage means for absorbing solar energy and converting it to heat for heating air in said passage means.

13. A system as defined in claim 2 wherein said transparent spaced walls include a first wall section formed of two glass windows spaced by an evacuated area and a second wall section, spaced from said first section, and formed of two glass windows spaced by an evacuated area.

14. A system as defined in claim 13 wherein said heating means include a plurality of horizontally extending, vertically spaced slats.

15. The combination of an energy conversion system for converting naturally occurring kinetic energy to mechanical and electrical energy and a multi-sided building with plural corners employed for housing or sheltering comprising:
   a. first converting means, including winddriven means positioned along one or more of said corners, whereby wind moving past said building causes said wind-driven means to rotate for converting naturally occurring kinetic energy to mechanical power;
   b. power linking means for conveying said mechanical power to power using facilities employed within said building;
   c. power converting and storage mean included in said linking means for converting and selectively storing said mechanical power;
   d. solar conversion means included in said first converting means for converting radiant solar energy to heat for heating a gaseous substance; and
   e. gas driven means included in said first converting means powered by the movement of said heated gaseous substance.

16. A system as defined in claim 15 wherein said solar conversion means includes:
   a. transparent, spaced walls formed along at least a portion of the external side surfaces of said edifice;
   b. air conducting passage means extending vertically between said spaced walls; and
   c. heat absorbing means contained within said passage means for absorbing solar energy and converting it to heat for heating air in said passage means.

17. A system as defined in claim 16 wherein said gas driven means includes a rotatable fan assembly mounted on the top of said edifice operable for conveying mechanical motion to said second converting means.

18. A system as defined in claim 17 further including means for selectively conveying said mechanical power to said compressing means, an electrical generating means on an air conditioning compressor means.

19. A system as defined in claim 18 wherein said fan assembly is rotatably floated in a circular, fluid containing mounting means.

20. A system as defined in claim 19 wherein said transparent spaced walls include a first wall section formed of two glass windows spaced by an evacuated area and a second wall section, spaced from said first section, and formed of two glass windows spaced by an evacuated area.

21. A system as defined in claim 20 wherein said heating means includes a plurality of horizontally extending, vertically spaced slats.

* * * * *

UNITED STATES PATENT OFFICE
CERTIFICATE OF CORRECTION

Patent No. 3,832,853                     Dated September 3, 1974

Inventor(s)  Tony W. Butler, Jr.

It is certified that error appears in the above-identified patent and that said Letters Patent are hereby corrected as shown below:

Column 5, line 19: change "dition" to -- duction --;
         line 61: change "G'" to -- G3' --;

Column 6, line 6:  change "eqiupped" to -- equipped --;
         line 64: change "sand" to -- said --;

Column 7, line 38: change "2" to -- 12 --;

Column 8, line 38: change "on" to -- or --.

Signed and sealed this 26th day of November 1974.

(SEAL)
Attest:

McCOY M. GIBSON JR.                C. MARSHALL DANN
Attesting Officer                  Commissioner of Patents